US010915515B2

(12) United States Patent
Bahry

(10) Patent No.: US 10,915,515 B2
(45) Date of Patent: Feb. 9, 2021

(54) DATABASE PERFORMANCE TUNING FRAMEWORK

(71) Applicant: ServiceNow, Inc., Santa Clara, CA (US)

(72) Inventor: Brent Bahry, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 743 days.

(21) Appl. No.: 15/667,405

(22) Filed: Aug. 2, 2017

(65) Prior Publication Data
US 2018/0322154 A1   Nov. 8, 2018

Related U.S. Application Data

(60) Provisional application No. 62/502,444, filed on May 5, 2017.

(51) Int. Cl.
| | |
|---|---|
| *G06F 16/00* | (2019.01) |
| *G06F 16/22* | (2019.01) |
| *G06F 16/2458* | (2019.01) |
| *G06F 16/2453* | (2019.01) |
| *G06F 17/18* | (2006.01) |

(52) U.S. Cl.
CPC ...... *G06F 16/2272* (2019.01); *G06F 16/2462* (2019.01); *G06F 16/24542* (2019.01); *G06F 17/18* (2013.01)

(58) Field of Classification Search
CPC .............. G06F 16/9535; G06F 16/2272; G06F 16/24542; G06F 16/2462; G06F 17/18; G06F 16/217

USPC ........................................................ 707/830
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,799,189 B2 | 9/2004 | Huxoll |
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg et al. |
| 7,131,037 B1 | 10/2006 | LeFaive |

(Continued)

*Primary Examiner* — Vincent F Boccio
(74) *Attorney, Agent, or Firm* — Fletcher Yoder PC

(57) ABSTRACT

Techniques related to a database performance tuning framework are disclosed. The techniques include a system for improving performance of a database query, the system configured to generate one or more query execution time statistics relating to a database query operation performed by a database in response to a received query, store the query execution time statistics, determine the database query operation is slow based on the stored query execution time statistics, generate one or more database statistics based on the contents of the database, generate a suggested index using one or more of the generated database statistics, create the suggested index, determine another one or more query execution time statistics for the database query operation after creating the suggested index, and retain the suggested index based on a comparison of the stored query execution time statistics and the another query execution time statistics.

16 Claims, 6 Drawing Sheets

(56) References Cited

U.S. PATENT DOCUMENTS

| | | |
|---|---|---|
| 7,160,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,945,860 B2 | 5/2011 | Vambenepe |
| 7,966,398 B2 | 6/2011 | Wiles |
| 8,051,164 B2 | 11/2011 | Peuter |
| 8,082,222 B2 | 12/2011 | Rangarajan |
| 8,151,261 B2 | 4/2012 | Sirota |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,887,133 B2 | 11/2014 | Behnia |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,773,032 B2 * | 9/2017 | Perry .................. G06F 16/217 |
| 9,792,387 B2 | 10/2017 | George |
| 9,805,322 B2 | 10/2017 | Kelkar |
| 9,852,165 B2 | 12/2017 | Morozov |
| 10,002,203 B2 | 6/2018 | George |
| 2013/0086038 A1 * | 4/2013 | Perry .................. G06F 16/217 707/715 |

* cited by examiner

DATABASE PERFORMANCE TUNING FRAMEWORK

CROSS REFERENCE TO RELATED APPLICATIONS

This application is a Non-Provisional Application claiming priority to U.S. Provisional Patent Application No. 62/502,444, entitled "DATABASE PERFORMANCE TUNING FRAMEWORK," filed May 5, 2017, which is herein incorporated in its entirety for all purposes.

TECHNICAL FIELD

Embodiments described herein generally relate to databases, such as those utilized in cloud computing, and in particular for a database performance tuning framework.

BACKGROUND ART

Cloud computing relates to the sharing of computing resources that are generally accessed via the Internet. In particular, cloud computing infrastructure allows users to access a shared pool of computing resources, such as servers, storage devices, networks, applications, and/or other computing based services. By doing so, users, such as individuals and/or enterprises, are able to access computing resources on demand that are located at remote locations in order to perform a variety computing functions that include storing and/or processing computing data. For users, cloud computing provides flexibility in accessing cloud computing resources without accruing up-front costs, such as purchasing network equipment, and investing time in establishing a private network infrastructure. Instead, by utilizing cloud computing resources, enterprise users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts an extension of SaaS that goes beyond providing software services by offering customizability and expandability features to meet a user's needs. For example, PaaS can provide a cloud based developmental platform for users to develop, modify, and/or customize applications and/or for automating enterprise operations without maintaining network infrastructure and/or allocating computing resources normally associated with these functions.

Within the context of automating enterprise, IT, and/or other organization-related functions (e.g., human resources (HR)), PaaS and SaaS often respond to incoming user requests by providing concurrent threads of execution, each of which may respond to an individual request, while maintaining per-user information access. These requests often require different types of searches, calculations or modifications of data stored in large databases. As a result of this environment, database applications utilized by web environments generally are required to logically maintain numbers of large result sets, and to be able to perform multiple types of calculations or insertions with high efficiency to maintain a reasonable performance level for the users. Innovative tools are needed to assist in effective control and analysis of this data within computer and communication network environments. Such tools may include tools for performance tuning of databases.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment, a system for improving performance of a database query is discussed. The system comprises a non-transitory memory and one or more hardware processors configured to read instructions from the non-transitory memory to cause the system to generate one or more performance statistics relating to a database operation performed by a database, store the one or more performance statistics, determine a performance optimization based on the stored performance statistics, generate one or more database statistics based on the contents of the database, perform the performance optimization using the generated one or more database statistics, determine another one or more performance statistics for the database operation after performing the performance optimization, and retain the performance optimization based on a comparison of the stored performance statistics and the other performance statistics.

In another embodiment, a method for improving performance of a database query is discussed. The method comprises generating one or more performance statistics relating to a database operation performed by a database, storing the one or more performance statistics, determining a performance optimization based on the stored performance statistics, generating one or more database statistics based on the contents of the database, performing the performance optimization using the generated one or more database statistics, determining another one or more performance statistics for the database operation after performing the performance optimization, and retaining the performance optimization based on a comparison of the stored performance statistics and the other performance statistics.

In yet another embodiment, a computer readable medium is discussed. The computer readable medium containing instructions that, when executed by a processor cause a programmable device to generate one or more performance statistics relating to a database operation performed by a database, store the one or more performance statistics, determine a performance optimization based on the stored performance statistics, generate one or more database statistics based on the contents of the database, perform the performance optimization using the generated one or more database statistics, determine another one or more performance statistics for the database operation after performing the performance optimization, and retain the performance optimization based on a comparison of the stored performance statistics and the other performance statistics.

BRIEF DESCRIPTION OF DRAWINGS

For a more complete understanding of this disclosure, reference is now made to the following brief description.

DESCRIPTION OF EMBODIMENTS

Figure 1:
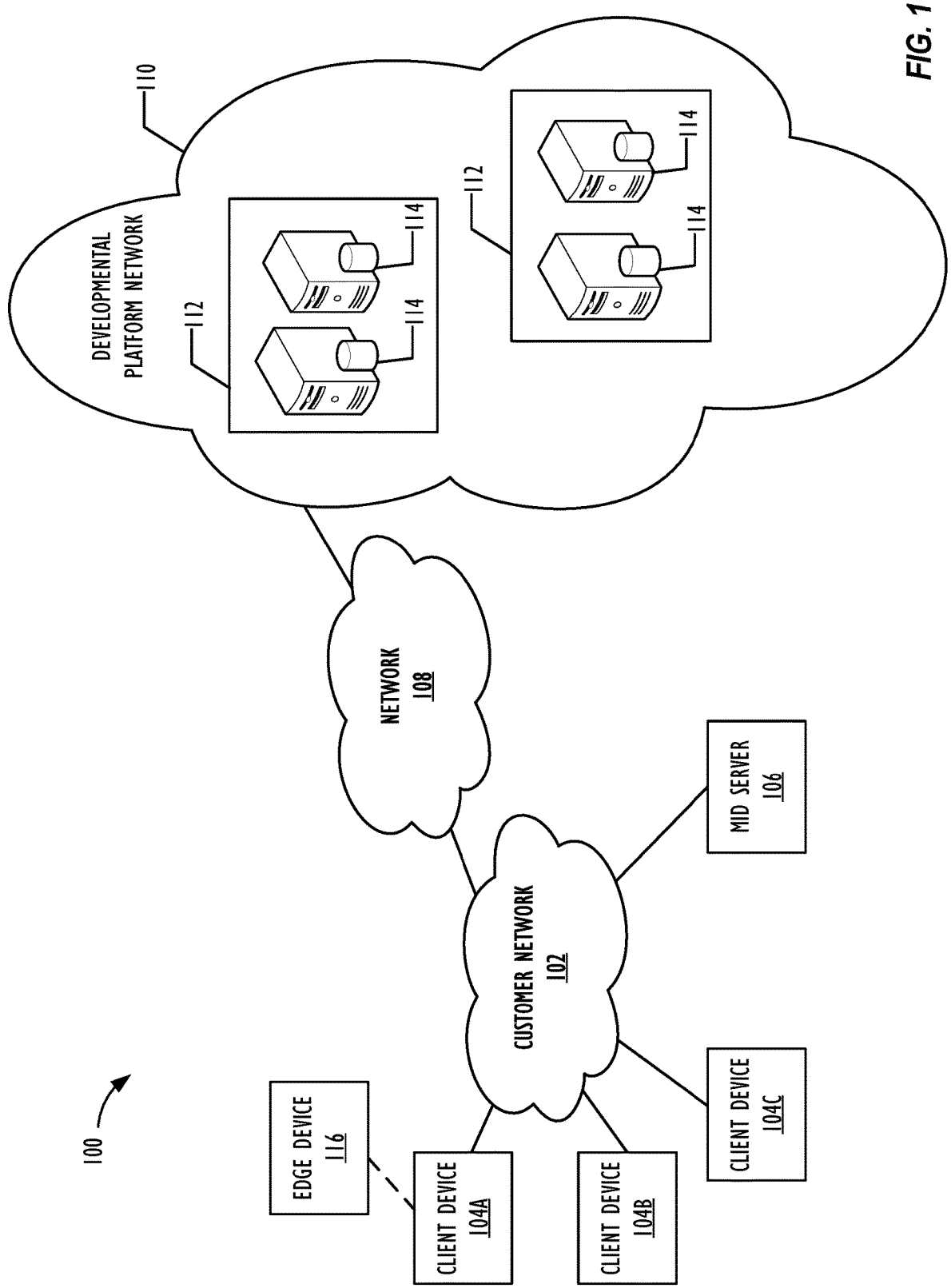
FIG. 1 is a schematic diagram of an embodiment of a network computing system where embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "computing system" refers to a single electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

Various example embodiments are disclosed herein for a database performance tuning framework. While described within context of a cloud computing environment, nothing in this disclosure is intended to limit embodiments of the present disclosure to cloud computing environments and embodiments of the present disclosure may be implemented in a variety of environments, such as in a stand-alone database application. Many applications, including cloud based services, utilize databases to collect, organize, and access data within various tables, queries and reports.

According to certain aspects, performance statistics may be collected over time relating to database operations, such as a query or script executions. These performance statistics over time may be analyzed to determine performance trend information characterizing particular operations. Performance optimizations may then be performed to enhance the performance of the particular operation and the effectiveness of these performance optimizations may checked.

Data within databases are generally organized in a way to support processing or accessing the data in meaningful ways. One such way is using a relational model of database management, or a relational database. This approach manages data within the database using a structure and language consistent with first order predicate logic. Data may be represented in tuples, or rows, and grouped into relations, or tables. Data elements may include various attributes, represented by columns of a table.

Data may be requested from a database via a query. Queries generally are formed in a database query language, such as structured query language (SQL). In SQL, queries may be formed of clauses which perform actions upon records and data. For example, a SQL query may make use of the SELECT clause, which retrieves data from one or more tables. WHERE clauses restrict the rows returned by a query by eliminating all rows from a specified set which do not evaluate to true. SQL may also include a JOIN clause which allows multiple tables to be joined into a query. SQL includes Boolean logic operators, such as AND and OR, which may be used to modify a query. Clauses such as GROUP BY and ORDER BY may group or sort rows and columns to reduce duplicate information or provide sorting functionality. Of note, the clauses discussed above are exemplary clauses and are not intended to be limiting. Certain queries may be run repeatedly, such as a query for generating a daily report.

Certain queries may run slower than others for a variety of reasons. In certain cases, adding or modifying indexes may help slowly executing queries execute in less time. However, determining what to include in an index that would be helpful in speeding up execution of a particular query is a specialized and difficult problem typically addressed by hand-tuning. A technique for suggesting an index to assist a particular slow query may be utilized in conjunction with a database performance tuning framework to detect the slow query, suggest an index, and verify that the suggested index does help a query execute faster.

Database indexes are data structures that may be used to help speed data access to database tables and may comprise a copy or links to the data within one or more rows from one or more tables. Indexes may be used to help quickly locate data without having to perform searches across rows to access data. Each index is defined and exists within the context of one or more tables in the database. Indexes are generally optional and are created by the user to enhance the speed of one or more queries performed on a table. The user can define more than one index for the same table, basing the indexes on different columns defined in the table. In certain cases, when the user defines an index based on columns in the table, the user may be requesting that the database to create a separate sorted list of all values of that column in that table, with a link from each value of the column to the location of the corresponding record in the table.

FIG. 1 is a schematic diagram of an embodiment of a computing system 100, such as a cloud computing system, where embodiments of the present disclosure may operate herein. Computing system 100 may include a customer network 102, network 108, and developmental platform network 110. In one embodiment, the customer network 102 may be a local private network, such as local area network (LAN) that includes a variety of network devices that include, but are not limited to switches, servers, and routers. In another embodiment, the customer network 102 represents an enterprise network that could include one or more local area networks (LANs), virtual networks, data centers 112 and/or other remote networks. As shown in FIG. 1, the customer network 102 is able to connect to one or more client devices 104A-C so that the client devices are able to communicate with each other and/or with the developmental platform network 110. The client devices 104A-C may be computing systems and/or other types of network devices generally referred to as Internet of Things that access cloud computing services, for example, via a web browser application or via an edge device 116 that may act as a gateway between the client device and the remote device. FIG. 1 also illustrates that the customer network 102 includes a management, instrumentation, and discovery (MID) servers 106 that facilitate communication of data between the developmental platform network 110, other external applications, data sources, and services, and the customer network 102. Although not specifically illustrated in FIG. 1, the customer network 102 may also include a connecting network device (e.g., gateway or router) or a combination of devices that implement a customer firewall or intrusion protection system.

FIG. 1 illustrates that customer network 102 is coupled to a network 108. The network 108 may include one or more computing networks available today, such as other LANs, wide area networks (WAN), the Internet, and/or other remote networks, in order to transfer data between the client devices 104A-C and the developmental platform network 110. Each of the computing networks within network 108 may contain wired and/or wireless programmable devices that operate in the electrical and/or optical domain. For example, network 108 may include wireless networks, such as cellular networks (e.g., Global System for Mobile Communications (GSM) based cellular network) wireless fidelity (Wi-Fi®) (Wi-Fi is a registered trademark owned by Wi-Fi Alliance Corporation) networks, and/or other suitable radio based network as would be appreciated by one of ordinary skill in the art upon viewing this disclosure. The network 108 may also employ any number of network communication protocols, such as Transmission Control Protocol (TCP) and Internet Protocol (IP). Although not explicitly shown in FIG. 1, network 108 may include a variety of network devices, such as servers, routers, network switches, and/or other network hardware devices configured to transport data over networks.

In FIG. 1, the developmental platform network 110 may be a remote network (e.g., a cloud network) that is able to communicate with the client devices 104A-C via the customer network 102 and network 108. The developmental platform network 110 acts as a platform that provides additional computing resources to the client devices 104A-C and/or customer network 102. For example, by utilizing the developmental platform network 110, users of client devices 104A-C are able to build and execute applications, such as automated processes for various enterprise, IT, and/or other organization-related functions. In one embodiment, the developmental platform network 110 includes one or more data centers 112, where each data center 112 could correspond to a different geographic location. Within the data center 112 include a plurality of server instances 114. Each server instance 114 can be implemented on a physical computing system, such as a single electronic computing device (e.g., a single physical hardware server) or could be in the form a multi-computing device (e.g., multiple physical hardware servers). Examples of server instances 114 include, but are not limited to a web server instance (e.g., a unitary Apache installation), an application server instance (e.g., unitary Java® Virtual Machine (JAVA is a registered trademark owned by Oracle America, Inc.)), and/or a database server instance (e.g., a unitary MySQL® catalog (MySQL is a registered trademark owned by MySQL AB A COMPANY)).

To utilize computing resources within the developmental platform network 110, network operators may choose to configure the data centers 112 using a variety of computing infrastructures. In one embodiment, one or more of the data centers 112 are configured using a multi-tenant cloud architecture such that a single server instance 114, which can also be referred to as an application instance, handles requests and serves multiple customers. In other words, data centers with multi-tenant cloud architecture commingle and store data from multiple customers, where multiple customer instances are assigned to a single server instance 114. In a multi-tenant cloud architecture, the single server instance 114 distinguishes between and segregates data and other information of the various customers. For example, a multi-tenant cloud architecture could assign a particular identifier for each customer in order to identify and segregate the data from each customer. Generally, implementing a multi-tenant cloud architecture suffer drawbacks, such as a failure to single server instance 114 causing outages for all customers allocated to the single server instance 114.

In another embodiment, one or more of the data centers 112 are configured using a multi-instance cloud architecture to provide every customer its own unique customer instance. For example, a multi-instance cloud architecture could provide each customer instance with its own dedicated application server and dedicated database server. In other examples, the multi-instance cloud architecture could deploy a single server instance 114 and/or other combinations of server instances 114, such as one or more dedicated web server instances, one or more dedicated application server instances, and one or more database server instances, for each customer instance. In a multi-instance cloud architecture, multiple customer instances could be installed on a single physical hardware server where each customer instance is allocated certain portions of the physical server resources, such as computing memory, storage, and processing power. By doing so, each customer instance has its own unique software stack that provides the benefit of data isolation, relatively less downtime for customers to access the developmental platform network 110, and customerdriven upgrade schedules. An example of implementing a customer instance within a multi-instance cloud architecture will be discussed in more detail below when describing FIG. 2.

Figure 2:
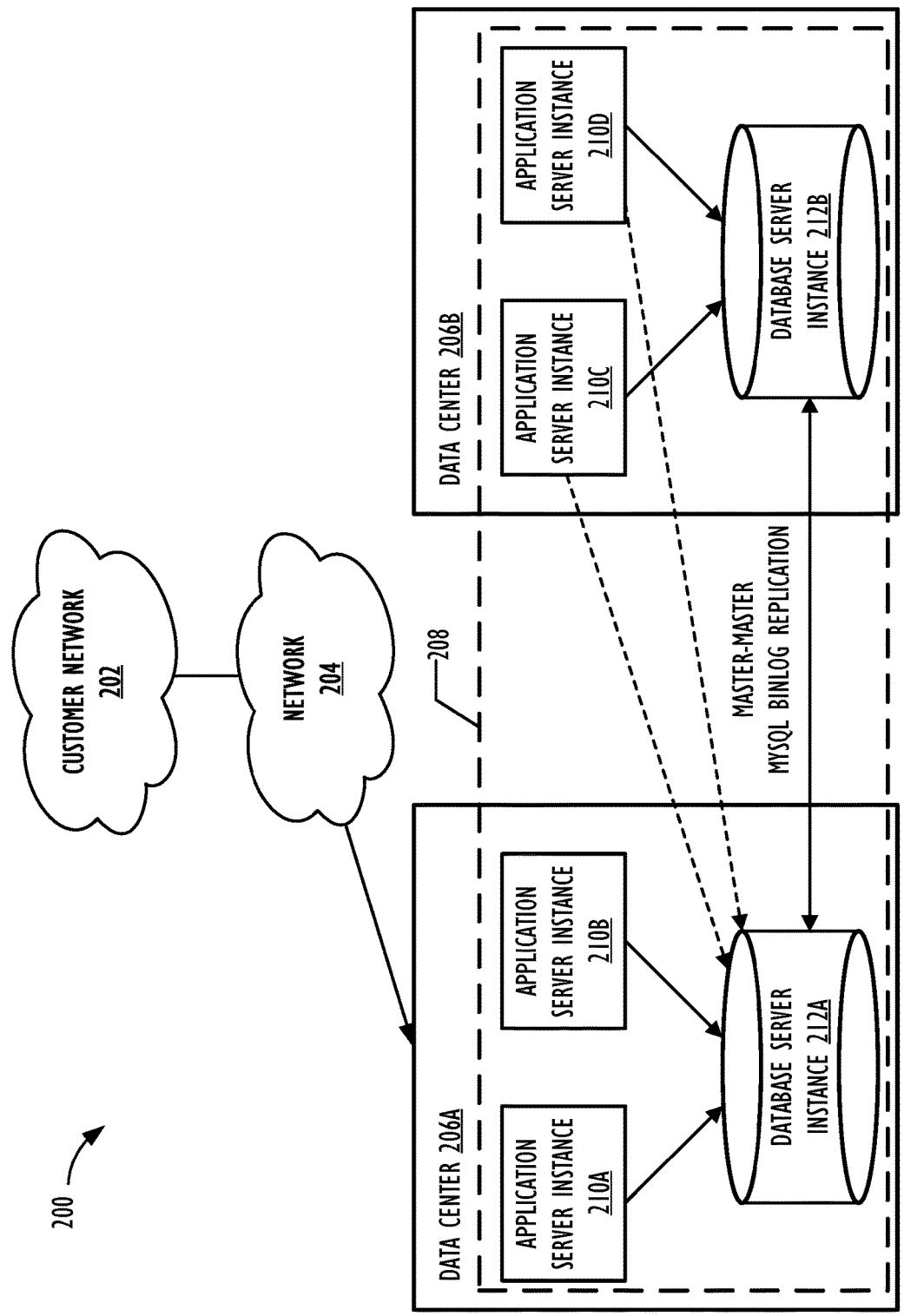
FIG. 2 is a schematic diagram of an embodiment of a multi-instance cloud architecture where embodiments of the present disclosure may operate.

FIG. 2 is a schematic diagram of an embodiment of a multi-instance cloud architecture 200 where embodiments of the present disclosure may operate herein. FIG. 2 illustrates that the multi-instance cloud architecture 200 includes a customer network 202 that connects to two data centers 206A and 206B via network 204. Customer network 202 and network 204 are substantially similar to customer network 102 and network 108 as described in FIG. 1, respectively. Data centers 206A and 206B can correspond to FIG. 1's data centers 112 located within developmental platform network 110. Using FIG. 2 as an example, a customer instance 208 is composed of four dedicated application server instances 210A-210D and two dedicated database server instances 212A and 212B. Stated another way, the application server instances 210A-210D and database server instances 212A and 212B are not shared with other customer instances 208. Other embodiments of the multi-instance cloud architecture 200 could include other types of dedicated server instances, such as a web server instance. For example, the customer instance 208 could include the four dedicated application server instances 210A-210D, two dedicated database server instances 212A and 212B, and four dedicated web server instances (not shown in FIG. 2).

To facilitate higher availability of the customer instance 208, the application server instances 210A-210D and database server instances 212A and 212B are allocated to two different data centers 206A and 206B, where one of the data centers 206 acts as a backup data center. In reference to FIG. 2, data center 206A acts as a primary data center 206A that includes a primary pair of application server instances 210A and 210B and the primary database server instance 212A for the customer instance 208, and data center 206B acts as a secondary data center 206B to back up the primary data center 206A for a customer instance 208. To back up the primary data center 206A for the customer instance 208, the secondary data center 206 includes a secondary pair of application server instances 210C and 210D and a secondary database server instance 212B. The primary database server instance 212A is able to replicate data to the secondary database server instance 212B. As shown in FIG. 2, the primary database server instance 212A replicates data to the secondary database server instance 212B using a Master-Master MySQL Binlog replication operation. The replication of data between data could be implemented in real time by implementing full backup weekly and daily incremental backups in both data centers 206A and 206B. Having both a primary data center 206A and secondary data center 206B allows data traffic that typically travels to the primary data center 206A for the customer instance 208 to be diverted to the second data center 206B during a failure and/or maintenance scenario. Using FIG. 2 as an example, if the application server instances 210A and 210B and/or primary data server instance 212A fails and/or is under maintenance, data traffic for customer instances 208 can be diverted to the secondary application server instances 210C and 210D and the secondary database server instance 212B for processing.

Although FIGS. 1 and 2 illustrate specific embodiments of a cloud computing system 100 and a multi-instance cloud architecture 200, respectively, the disclosure is not limited to the specific embodiments illustrated in FIGS. 1 and 2. For instance, although FIG. 1 illustrates that the developmental platform network 110 is implemented using data centers, other embodiments of the of the developmental platform network 110 are not limited to data centers and can utilize other types of infrastructures. Moreover, other embodiments of the present disclosure may combine one or more different server instance into a single server instance. Using FIG. 2 as an example, the application server instances 210 and database server instances 212 can be combined into a single server instance. The use and discussion of FIGS. 1 and 2 are only examples to facilitate ease of description and explanation.

Figure 3:
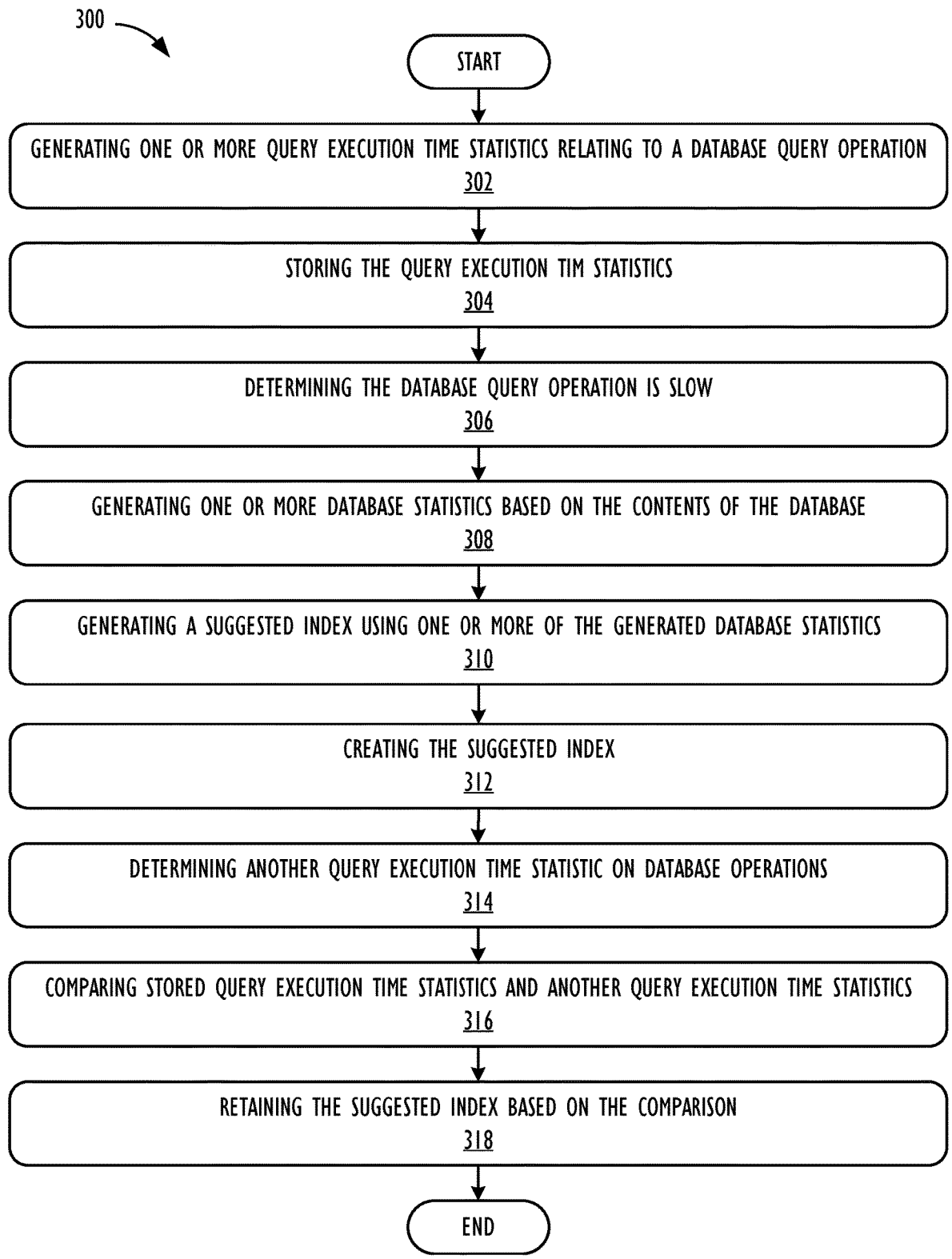
FIG. 3 is a flow diagram illustrating a technique for a database performance tuning framework, according to an embodiment.

FIG. 3 is a flow diagram illustrating a technique for a database performance tuning framework 300, according to an embodiment. At step 302, generating one or more query execution time statistics relating to a database query operation performed by a database in response to a received query. According to certain aspects, detailed information may be logged for operations performed by a database, including transactions, executed queries, script evaluations, stack traces leading to each query or script, along with timestamps. Performance statistics based on this this information may be used to help characterize the performance of a particular operation. Multiple similar operations may be grouped. For example, in the case of queries, certain queries may be executed multiple times (either in parallel at once or sequentially over time) with small variations in between the executions. This may result in multiple queries which are structurally identical (e.g. the same query with different constant values). These multiple queries may be grouped together to generate performance statistics such as aggregate query execution statistics over time, which may include average execution time, query count, total execution time, etc. At step 304, the query execution time statistics may be stored, for example, as a performance snapshot.

At step 306, determining the database query operation is slow based on the stored query execution time statistics may be performed. Particular performance optimizations may be determined based upon the aggregated metrics for operations. For example, a particular group of queries may be identified from these grouped queries as a slow query.

Slow queries may be identified based, at least in part, on the average or total execution times determined for a particular group of queries. For example, an average execution time may be determined by averaging the execution times of each query of the particular group of queries. Similarly, the total execution time may be determined by summing the execution times of each query of the particular group of queries. In certain cases, groups of queries may then be sorted by the average or total execution time. Other sorting criteria may also be used, such as a minimum or maximum execution time, or other performance time metric. A determination that a particular group of queries is slow may then be based on, for example, a comparison against a configurable threshold time. For example, a particular threshold time may be set and all queries having a performance time metric greater that the threshold time may be determined to be slow. In certain cases, a number or percentage of groups of queries may be determined to be slow, such as a top N slowest groups of queries or an M percentage of the slowest groups of queries. Other techniques for determining a slow query may also be used and the above discussed techniques are intended to be representative examples.

In certain cases, there may be multiple or different determinations utilized to identify slow queries. For example, in cases where it is important to ensure queries execute within a particular time window, it may be useful to look at average execution times in determining which queries are slow. In cases where the total number of queries should be taken into consideration, it may be useful to look at the total execution time in determining which queries are slow. Some databases may utilize multiple layers of determinations. As an example, a determination that a query is slow may be based on a top N slowest queries having a total execution time greater than the threshold time, which have run less than X times. Other techniques for determining that a query is slow may also be utilized and the precise technique may be configurable based on user, administrative, or other requirements.

At step 308, generating one or more database statistics based on the contents of the database may be performed. Performance optimizations may have database statistics that need to be performed prior to the performance optimizations. These database statistics may be scheduled to be performed in preparation to the performance optimization. Returning to the query example, generating a suggested index for a slow executing query may utilize certain database statistics characterizing columns and data within the database and these database statistics may be relatively time consuming to calculate. For example, a distinct cardinality, which may be an indication of how unique the data values in a column are, may be calculated for each row of a table. These calculations may be scheduled to be calculated and stored for later use when generating the suggested index.

In certain cases, prior to implementing a performance optimization, a determination may be made that the performance optimization may not be effective. As a result of this determination, the particular performance optimization, that would otherwise be made, is not performed. For example, even though a very slow query may be identified, a determination may be made not to generate a suggested index for the query due to the table size. A check may be performed prior to attempting to generate the suggested index to check a number of rows in one or more tables referenced by a slow query. If the number rows in the one or more tables are relatively large, exceeding a threshold number of rows, any generated index may not be performant for the one or more tables. Additionally, for tables with a relatively large number of rows, actually determining the number of rows in the table may incur a significant performance hit. An estimate of the number of rows may be used in place of an actual determination of the number of rows. In such cases, an index may not be suggested.

At step 310, generating a suggested index using the generated database statistics may be performed. Returning to the query example, a suggested index may be created for a slow executing query. In creating a suggested index, after the slow query has been identified, the query may be parsed to group the columns. A histogram of database statistics, weights calculated based on those statistics, clause evaluations, and other factors may be created based on the grouped columns to determine which columns referenced by the query should be included in the suggested index. Additionally, a set of special case rules may be applied to handle cases where a suggested index may not be beneficial.

At step 312, the suggested index is created. Returning to the query example, after a suggested index is created, the suggested index may be implemented. In certain cases the suggested index may be propagated to a user and the user may decide whether to use the suggested index. In certain cases, the suggested index may simply be implemented, for example, if the user has previously indicated to implement suggested indexes. At step 314 determining another one or more query execution time statistics for the database query operation after creating the suggested index may be performed. After the suggested index is implemented, the query (previously identified as being the slow query) may be executed again during the regular course of database operations. For example the query may be a regularly scheduled query which continues to run as scheduled independently of index suggestion. Another query execution time statistics related to the database operations after the implementation of the suggested index may be generated. This other query execution time statistic may be generated from more than one execution of the slow query.

At step 316, comparing the stored query execution time statistics and the another query execution time statistics may be performed. For example, the performance statistics for a query after a suggested index is implemented may be compared to the performance statistics for the query from prior to implementing the suggested index. At step 318, the suggested index may be retained based on the comparison. For example, if the execution of the slow query is improved after the suggested index is created, the suggested index may be retained. In certain cases, a threshold may be applied such that the suggested index is retained where the performance of the slow query is improved by at least a threshold percentage or time frame after the suggested index is created. Such a threshold may be used to ensure that the increased performance of the database operation is worth any potential tradeoffs incurred by the performance optimization (e.g., increased database size, memory requirements, etc.). If performance of the database operation after implementation of the performance optimization decreases or does not meet the threshold, then the performance optimization may be discarded. This threshold may also be configurable.

The techniques discussed above comprise multiple steps or actions which may be interchanged or rearranged without departing from the scope of the claims. For example, steps and/or actions may be performed in another order, performed concurrently, modified, or omitted without departing from the scope of the claims.

Figure 4:
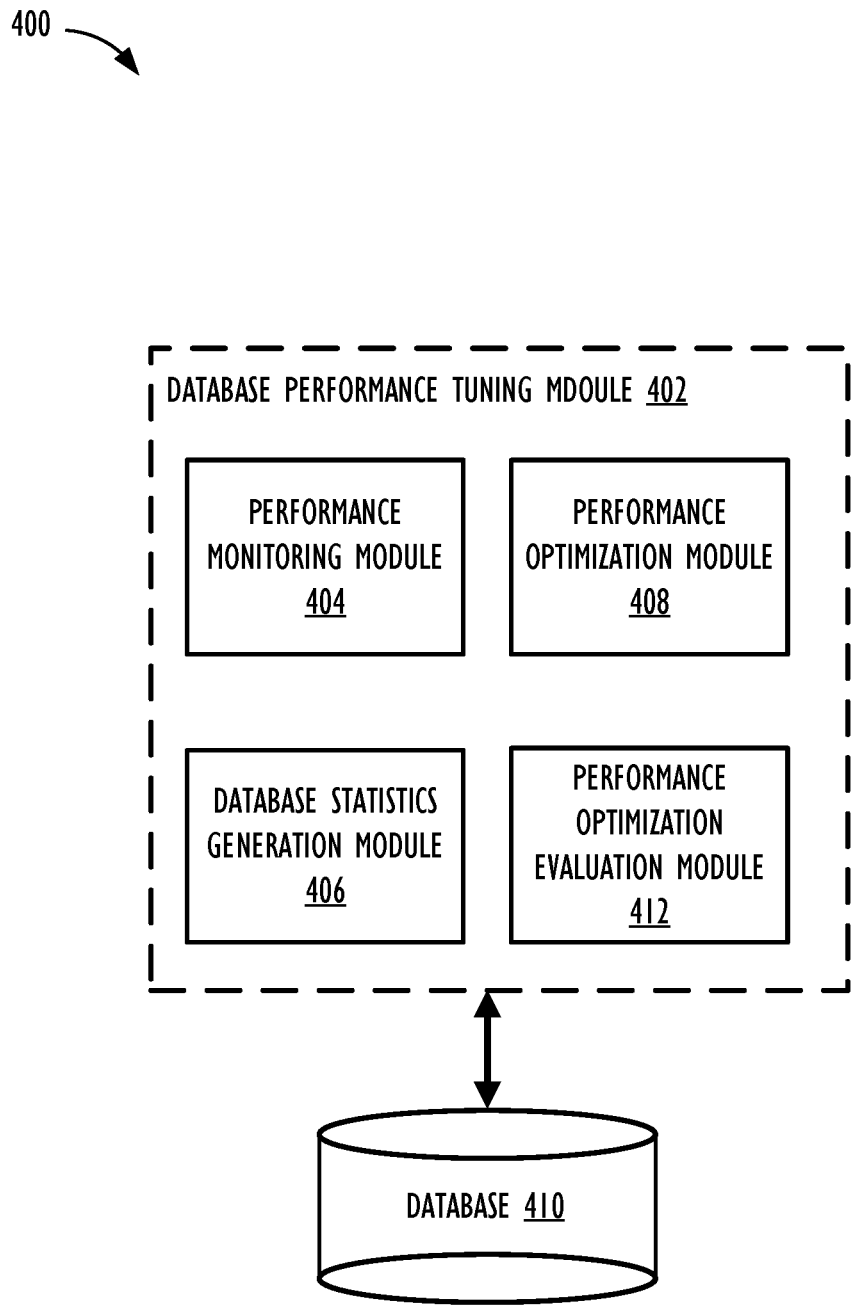
FIG. 4 is a block diagram illustrating a system for database performance tuning, according to an embodiment.

FIG. 4 is a block diagram illustrating a system for database performance tuning 400, according to an embodiment. The system for database performance tuning 400 may include a database performance tuning module 402, along with a database 410. The database performance tuning module 402 may execute within the context of an application server instance, as a part of a management console, or as a module separate from the application server. The database performance tuning module 402 may include a performance monitoring module 404, which may generate query execution time statistics by monitoring database operations. A database statistics generation module 406 may generate various database statistics that may be utilized in determining a performance optimization. For example, the database statistics may be utilized by generation module may receive an indication from a performance optimization module 408 to help determine a performance optimization to apply. Generating the database statistics may be relatively resource intensive and cause performance issues for other database processes. To help avoid potential performance impacts, the performance optimization module 408 may indicate one or more database statistics to collect, which may be scheduled, for example, during off-peak hours or other times when other database operations are relatively low. The performance optimization module 408 may perform one or more performance optimizations to help improve performance of a particular database operation. For example, as discussed above, an index suggestion engine may generate suggested indexes to improve the performance of a particular query. A performance optimization evaluation module may, using query execution time statistics from the performance monitoring module 404 generated after a particular performance optimization is implemented, determine whether to retain the particular performance optimization.

The various illustrative blocks or modules described herein may be differently organized than as described without departing from the scope of the claims. For example, blocks or modules discussed may be contained within other modules, distributed across multiple modules, combined, or otherwise reorganized without departing from the scope of the claims.

Figure 5:
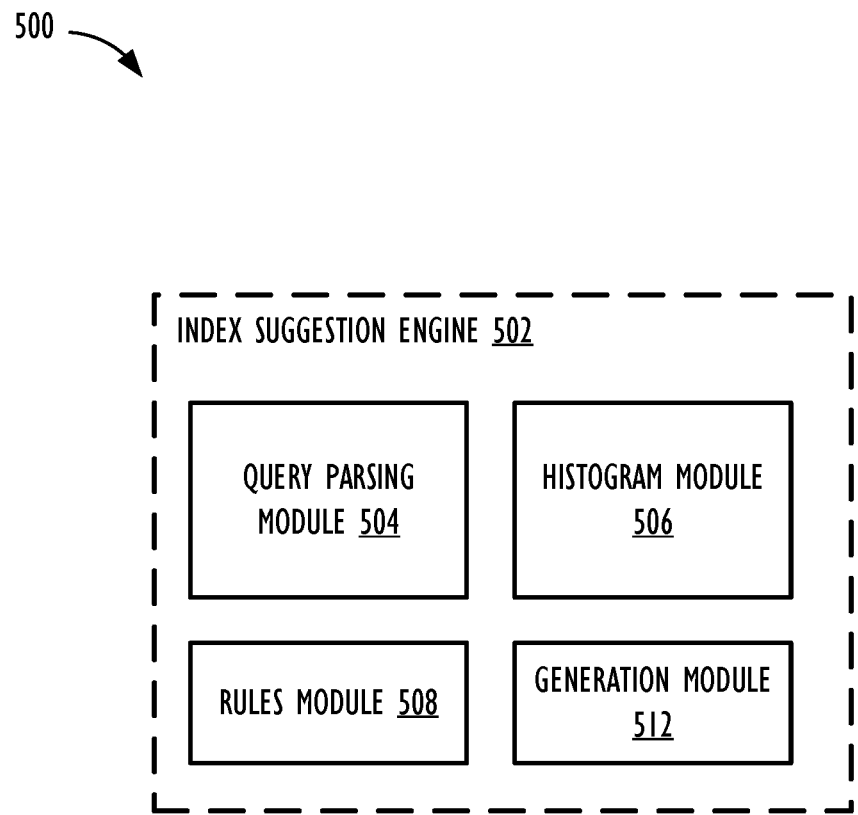
FIG. 5 is a block diagram illustrating an example performance optimization module, according to an embodiment.

FIG. 5 is a block diagram illustrating an example performance optimization module 500, according to an embodiment. An example of a performance optimization module may include an index suggestion engine 502. The index suggestion engine 502 may execute within the context of an application server instance, as a part of a management console, or as a module separate from the application server. The index suggestion engine 502 may comprise a query parsing module 504, which may parse and group fields of the table based on the clauses of the query to identify columns. A histogram module 506 may create a histogram based on the identified columns and evaluate a set of weights for the columns. A special rules module 508 may evaluate the columns of the histogram based on a set of special case rules. A generation module 512 may generate a suggested index based on the histogram and evaluation.

Figure 6:
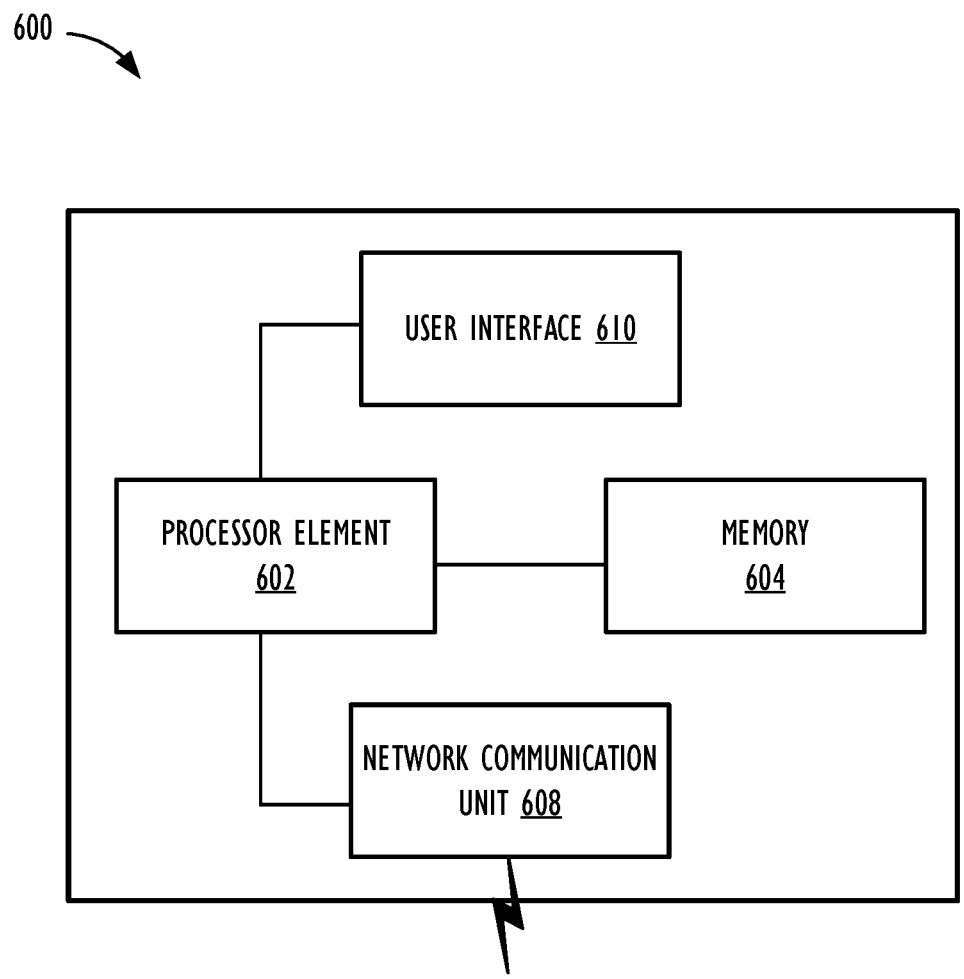
FIG. 6 is a block diagram illustrating an embodiment of computing system for use with techniques described herein.

Referring now to FIG. 6, a block diagram illustrates a computing device 600 that may be used for implementing the techniques described herein in accordance with one or more embodiments (e.g., flow diagram 300, system for database performance tuning 400, and example performance optimization module 500). For example, the computing device 600 illustrated in FIG. 6 could represent a client device or a physical server device. As shown in FIG. 6, the computing device 600 can include can also include one or more input/output devices, such as a network communication unit 608 that could include a wired communication component and/or a wireless communications component, which can be coupled to processing element 602. The network communication unit 608 can utilized any of a variety of standardized network protocols, such as Ethernet, TCP/IP, to name a few of many protocols, to effect communications between devices and comprise one or more transceiver(s) that utilize the Ethernet, power line communication (PLC), WiFi, and/or other communication methods.

The computing system 600 includes a processing element 602 that contains one or more hardware processors, where each hardware processor may have a single or multiple processor cores. In one embodiment, the processing element 602 may include at least one shared cache that store data (e.g., computing instructions) that are utilized by one or more other components of processing element 602. For example, the shared cache may be locally cache data stored in a memory for faster access by components of the processing elements 602. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) a microprocessor. Although not illustrated in FIG. 6, the processing element 600 may also include one or more other types of hardware processing components, such as graphics processing units (GPU), application specific integrated circuits (ASICs), field-programmable gate arrays (FPGAs), and/or digital signal processors (DSPs).

FIG. 6 illustrates that memory 604 may be operatively coupled to processing element 602. Memory 604 may be a non-transitory medium configured to store various types of data. For example, memory 604 may include one or more memory devices that comprise a non-volatile storage device and/or volatile memory. Volatile memory, such as random access memory (RAM), can be any suitable non-permanent storage device. The non-volatile storage devices can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage device may be used to store overflow data if allocated RAM is not large enough to hold all working data. The non-volatile storage device may also be used to store programs that are loaded into the RAM when such programs are selected for execution.

Persons of ordinary skill in the art are aware that software programs may be developed, encoded, and compiled in a variety computing languages for a variety software platforms and/or operating systems and subsequently loaded and executed by processing element 602. In one embodiment, the compiling process of the software program may transform program code written in a programming language to another computer language such that the processing element 602 is able to execute the programming code. For example, the compiling process of the software program may generate an executable program that provides encoded instructions (e.g., machine code instructions) for processor 602 to accomplish specific, non-generic, particular computing functions.

After the compiling process, the encoded instructions may then be loaded as computer executable instructions or process steps to processing element 602 from storage (e.g., memory 604) and/or embedded within the processing element 602 (e.g., cache). Processing element 602 can execute the stored instructions or process steps in order to perform instructions or process steps to transform the computing device into a non-generic, particular, specially programmed machine or apparatus. Stored data, e.g., data stored by a storage device, can be accessed by processing element 602 during the execution of computer executable instructions or process steps to instruct one or more components within the computing device 600.

A user interface 610 can include a display, positional input device (such as a mouse, touchpad, touchscreen, or the like), keyboard, or other forms of user input and output devices. The user interface 610 can be coupled to processor element 602. Other output devices that permit a user to program or otherwise use the computing device can be provided in addition to or as an alternative to network communication unit 608. When the output device is or includes a display, the display can be implemented in various ways, including by a liquid crystal display (LCD) or a cathode-ray tube (CRT) or light emitting diode (LED) display, such as an OLED display. Persons of ordinary skill in the art are aware that the computing device 600 may comprise other components well known in the art, such as sensors, powers sources, and/or analog-to-digital converters, not explicitly shown in FIG. 6. For ease of discussion, FIG. 6 explanation of these other components well known in the art.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application

What is claimed is:

1. A system for improving performance of a database query, comprising:
   a non-transitory memory; and
   one or more hardware processors configured to read instructions from the non-transitory memory to cause the system to:
      generate one or more query execution time statistics relating to a database query operation performed by a database in response to a received query;
      store the query execution time statistics;
      determine the database query operation is slow based on the stored query execution time statistics;
      generate one or more database statistics based on the contents of the database;
      generate a suggested index using one or more of the generated database statistics;
      create the suggested index;
      determine another one or more query execution time statistics for the database query operation after creating the suggested index;
      determine that the query executes faster after the creation of the suggested index by at least a threshold amount of time, or at least a threshold percentage, or both; and
      retain the suggested index based on the determination that the query executes faster after the creation of the suggested index.

2. The system of claim 1, wherein the suggested index is created in response to an indication received from a user to create the suggested index.

3. The system of claim 1, wherein the one or more database statistics comprise distinct cardinality information calculated based on data within in the database.

4. The system of claim 1, comprising:
   grouping two or more queries together based on the characteristics of the queries; and
   determining the one or more query execution time statistics based on the grouped queries.

5. The system of claim 4, wherein the one or more query execution time statistics comprises an average query execution time for the query, or a total query execution time for the query, or a combination thereof.

6. The system of claim 1, wherein generating the one or more database statistics based on the contents of the database comprises creating a histogram of database statistics, or one or more weights calculated based on the database statistics, or one or more clause evaluations, or a combination thereof.

7. The system of claim 6, wherein generating the suggested index using the one or more data statistics comprises using the histogram of database statistics, or the one or more weights, or the one or more clause evaluations, or the combination thereof, to determine which columns of the database to include in the suggested index.

8. A method for improving performance of a database query, comprising:
   generating one or more query execution time statistics relating to a database query operation performed by a database in response to a received query;
   storing the query execution time statistics;
   determining the database query operation is slow based on the stored query execution time statistics;
   generating one or more database statistics based on the contents of the database;
   generating a suggested index using one or more of the generated database statistics;
   creating the suggested index;
   determining another one or more query execution time statistics for the database query operation after creating the suggested index;
   determining that the query executes faster after the creation of the suggested index by at least a threshold amount of time, or at least a threshold percentage, or both; and
   retaining the suggested index based on the determination that the query executes faster after the creation of the suggested index.

9. The method of claim 8, wherein the suggested index is created in response to an indication received from a user to create the suggested index.

10. The method of claim 8, wherein the one or more database statistics comprise a distinct cardinality information calculated based on data within in the database.

11. The method of claim 8, comprising:
    grouping two or more queries together based on the characteristics of the queries; and
    determining the one or more query execution time statistics based on the grouped queries.

12. The method of claim 11, wherein the one or more query execution time statistics comprises an average query execution time for the query, or a total query execution time for the query, or a combination thereof.

13. A computer readable medium containing instructions that, when executed by a processor cause a programmable device:

generate one or more query execution time statistics relating to a database query operation performed by a database, in response to a received query;

store the query execution time statistics;

determine the database query operation is slow based on the stored query execution time statistics;

generate one or more database statistics based on the contents of the database;

generate a suggested index using one or more of the generated database statistics;

create the suggested index;

determine another one or more query execution time statistics for the database query operation after creating the suggested index;

determine that the query executes faster after the creation of the suggested index by at least a threshold amount of time, or at least a threshold percentage, or both; and retain the suggested index based on the determination that the query executes faster after the creation of the suggested index.

14. The computer readable medium of claim 13, wherein the suggested index is created in response to an indication received from a user to create the suggested index.

15. The computer readable medium of claim 13, wherein one or more database statistics comprise a distinct cardinality information calculated based on data within in the database.

16. The computer readable medium of claim 13, comprising:

grouping two or more queries together based on the characteristics of the queries; and determining the one or more query execution time statistics based on the grouped queries.

* * * * *